Oct. 23, 1934.   R. GROVER   1,977,910
METHOD OF PISTON RING MANUFACTURE
Original Filed Feb. 28, 1931
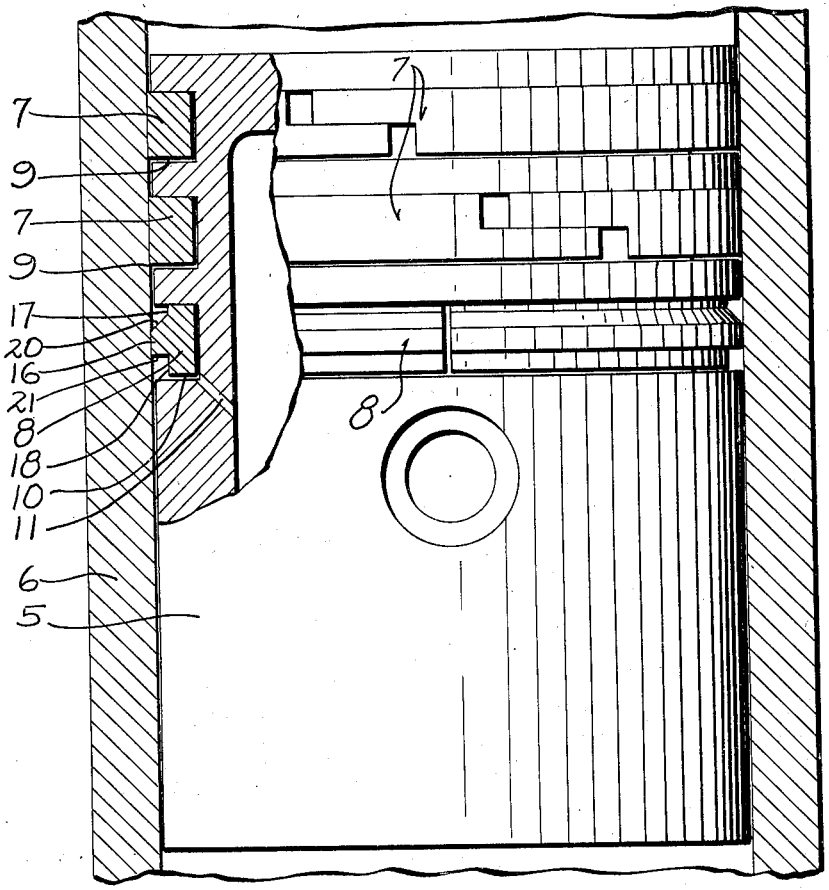
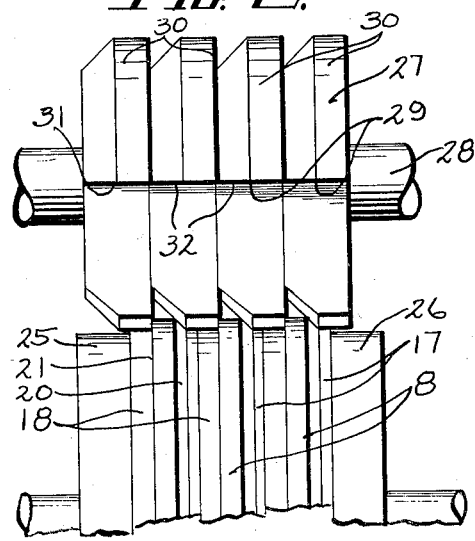
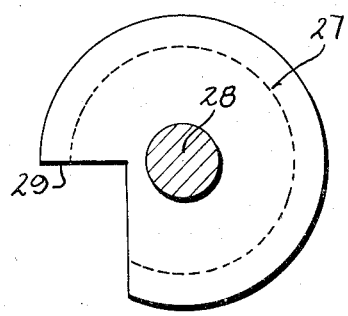
Ray Grover, Inventor
By Wheeler, Wheeler & Wheeler
Attorneys Patented Oct. 23, 1934

1,977,910

UNITED STATES PATENT OFFICE 1,977,910

METHOD OF PISTON RING MANUFACTURE

Ray Grover, Milwaukee, Wis.

Original application February 28, 1931, Serial No. 519,049, now Patent No. 1,911,755, dated May 30, 1933. Divided and this application January 22, 1932, Serial No. 588,097

2 Claims. (Cl. 29—156.63)

This invention relates to improvements in methods of piston ring manufacture. The present application is a division of my application Serial No. 519,049, entitled Packing rings and methods of manufacture thereof, filed February 28, 1931 (Pat. No. 1,911,755, May 30, 1933).

It is the object of the invention to provide a novel and economical method of manufacturing a piston ring which will prevent stoppage of oil transfer past a piston. It is proposed that the ring have a peculiar peripheral contour in cross section, the contour being determined in general by considerations relating to the effective sealing of the piston against oil displacement and being determined in some particular respects by the convenient application of the manufacturing method here disclosed.

The peripheral conformation of the ring is closely connected with the desired process of manufacture, whereby great economies are effected in production and desired accuracy of result is obtained notwithstanding the use of quantity production methods.

In the drawing:

Figure 1 is a large scale view showing a cylinder in section and a piston and its rings in elevation, with portions of the rings and piston wall broken away to an axial section.

Figure 2 is a fragmentary detail view illustrating a step in the process of manufacture of my improved ring, the rings being illustrated in side elevation between a head and tail stock, a special set of forming tools being also illustrated in side elevation.

Figure 3 is an end elevation of the milling tool set shown in Figure 2.

Like parts are identified by the same reference characters throughout the several views.

The piston 5, operating in cylinder 6, is provided with packing rings at 7 which may be of any desired construction. The ring 8 is an oil ring, preferably made by the special method herein disclosed, and having a peculiar peripheral conformation and a peculiar relation to the piston for the purposes of this invention.

It will be noted that rings 7 are fitted closely to their grooves 9. In $\frac{1}{8}$ inch to $\frac{5}{16}$ inch piston rings it is customary to fit the ring to its groove with an axial clearance averaging one one-thousandth of an inch and with a maximum of two one-thousandths of an inch. In accordance with my present invention, the ring 8 has a substantially greater axial clearance in its groove 10, which for rings of $\frac{1}{8}$ to $\frac{5}{16}$ inch in transverse measurements should exceed three one-thousandths of an inch and preferably approximate five one-thousandths of an inch. The groove 10 is drained by a duct 11 to the interior of the piston, as is common wherever oil rings are used. In accordance with the present invention, however, this drain does not merely conduct away by gravity the oil collected by the ring but serves as an outlet for lubricant which is actually displaced by the ring, which acts as a displacement pump during the operation of the piston by virtue of its peculiar conformation and the clearance aforesaid.

It will be understood that the amount of clearance specified is subject to variation according to the kind of lubricant used and other factors affecting capillary attraction of the lubricant for the ring, the piston, and the cylinder wall, as will hereafter be explained.

The inner peripheral surface 15 of the ring 8 preferably is spaced conventionally to the bottom of the piston groove 10. The outer surface of the ring, instead of being in full peripheral contact with the cylinder wall, is preferably reduced in area by marginal peripheral cuts which may divide the periphery of the ring into three parts. One part of the area is represented by the central land 16 and one part by each of the annular notches adjacent thereto.

The notches are so formed that the ring has annular cylindrical bottom walls 17 and 18, respectively, which are coaxial with the ring and of substantially like radius. The surface leading from wall 17 to the outer periphery of land 16 is an inclined or bevelled surface 20, while the surface leading from wall 18 to the periphery of the land 16 is a right angle shoulder 21.

As the piston 5 moves upwardly in cylinder 6 its rings wipe the wall of the cylinder, and any excess of oil which has managed to reach the wall of the cylinder above the oil ring 8 will tend to accumulate above bevelled surface 20 and above the oil ring 8, which, because of its relatively great clearance in the ring groove 10 and its friction against the cylindrical wall, will have positioned itself at the bottom of its groove. The spacing between the ring and the groove should be such as to leave a space between the ends of the ring and the piston exceeding that space which may be bridged by capillary attraction of the lubricant to the surfaces. If the ring has merely the tolerance or clearance ordinarily employed capillary action will retain lubricant between the ends of the ring and the piston walls, and hence there will be no substantial variation in capacity of the oil space.

It is believed that the beveled surface 20 facilitates transfer of lubricant thus accumulated from the space above the ring to the corresponding space below the ring which appears upon change of direction of piston movement. It may be that because of the bevel at 20 the upward movement of the ring does not positively scrape lubricant from the cylinder wall but allows it to pass the ring as the ring moves upwardly. It may be also that when the piston reaches the top of its stroke and starts downwardly the resulting displacement by the ring of the lubricant accumulated thereabove produces sufficient pressure to enable the lubricant to pass the ring. In any event, it is a demonstrated fact that the use of the ring will result in substantially relieving the cylinder of lubricant above the ring and delivering all excess lubricant through duct 11.

The sharp angle between right angle surface 21 and the periphery of land 16 functions as a scraper so that as the piston moves downwardly with the oil ring 8 in the top of its groove excess lubricant is scraped from the cylinder wall into the lower marginal notch and the space below the ring which, as above explained, is in excess of the space which can be bridged by the type of lubricant employed. Considerable lubricant will be accumulated in this space as the piston moves downwardly, and upon change of piston direction the cylinder wall friction upon land 16 causes the ring to tend to stand still while the piston moves upwardly against it. Thus, the ring acts like a displacement pump and expels through duct 11 the lubricant accumulated.

The cylindrical surfaces 17 and 18 of the peripherally notched portions of ring 8 greatly facilitate the preferred process of manufacture, as hereinafter disclosed.

Any number of rings are mounted coaxially for rotation between a head stock 25 and a tail stock 26, as illustrated by the three rings shown in Figure 2. As the head stock and tail stock are rotated the ring blanks are acted on by a cutting tool which may comprise a former 27 mounted on shaft 28 and notched to provide a cutting edge at 29. There will be a number of individual forming elements 30 to a number exceeding by one the number of rings to be finished. These elements may be unitarily connected, as shown in the forming device 27, if desired. In each element the cutting edge 29 has a rectilinear portion 31 parallel to the axis of the cutter shaft 28 and corresponding in axial length to the combined corresponding dimensions of ring surfaces 17 and 18. It will be observed that the cutting edge 31 spans the joint between two adjacent rings.

Immediately adjacent the cutting margin 31 is an inclined or beveled cutting margin 32 corresponding to the desired inclination of margin 20 of the ring. It is unnecessary, because of the fact that the cutter operates simultaneously on two rings, to govern accurately the length or the exact position of the inclined surface 32 of the cutter.

If the upper face of land 16 were beveled all the way to the upper face of the ring it would be necessary that the milling or cutting tool have the apex of its angular cutting surface coincide perfectly with the joint between two adjacent rings. It is the indicated ring contour, having corresponding surfaces 17 and 18 at each end of each ring, that makes it possible to produce the ring in quantities with cutting elements each of which act simultaneously on two rings as shown.

Tests have demonstrated the fact that the mere substitution of the oil ring herein disclosed for one of the packing rings in any piston, having a groove substantially longer than the ring in accordance with the foregoing disclosure, will completely eliminate waste of oil past such a piston. This ring has been used not only in internal combustion engines, but also in air compressors, and it operates to limit the lubricant on the wall of the cylinder to that required for actual piston lubrication, so that virtually none of the lubricant escapes. The most serious cases of "oil pumping" have been corrected by use of one ring per offending piston.

I claim:

1. The method of manufacturing piston rings having raised peripheral lands intermediate the end faces of the rings, each of said lands having one radial and one slanting marginal wall, which method consists in rotating axially aligned ring blanks and applying a tool to two contiguous rings to simultaneously machine marginal portions of said blanks, said tool being shaped to contour the said radial and slanting walls of their respective blanks, whereby the radial wall of one ring as formed by the tool may comprise a bulwark guide for the tool to prevent the crowding of the tool in the process of cutting the slanting wall of the other ring, said machining being continued peripherally of the aligned blanks until the machined portions are reduced to substantially less diameter than the periphery of said lands.

2. The method of manufacturing piston rings having raised peripheral lands intermediate their end faces, each of said lands having one radial and one slanting marginal wall, which method consists in the co-axial alignment of ring blanks, the application to the series of blanks of cutting tools, whereby each tool is applied to two adjacent rings to simultaneously machine marginal portions of said blanks, said tool being shaped to contour the said radial and slanting walls of the respective blanks, whereby the radial wall of one ring as formed by the tool may comprise a guide for the tool to prevent the crowding of the tool in the process of cutting the slanting wall of the other ring, said machining being continued peripherally of the aligned blanks until the machined portions are reduced to substantially less diameter than the periphery of said lands.

RAY GROVER.